Aug. 26, 1969 N. J. RYSKAMP 3,463,555
VEHICLE WHEEL BRAKING SYSTEM PROVIDING WHEEL SLIP CONTROL
Original Filed Nov. 15, 1967
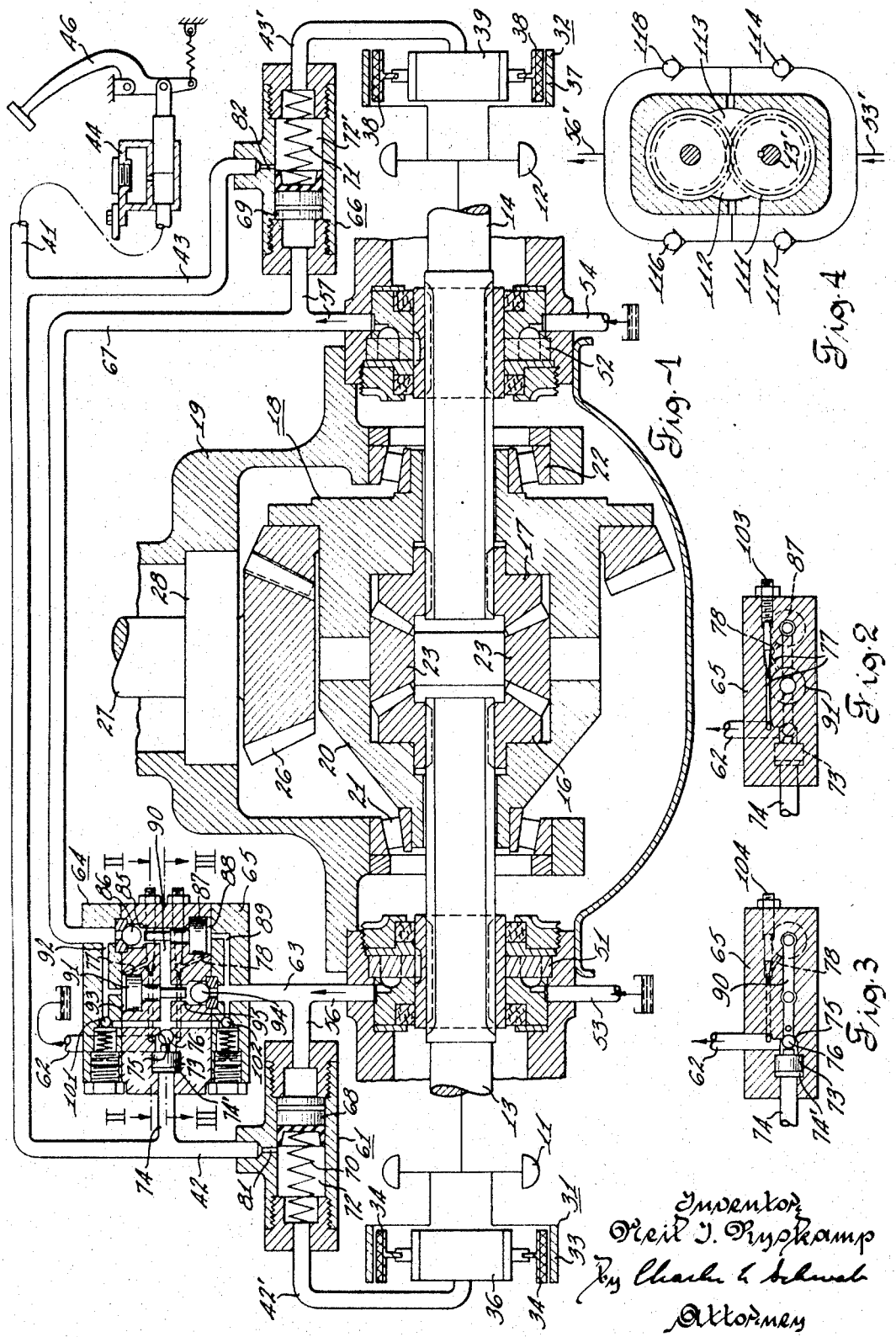
Inventor
Neil J. Ryskamp
By Charles L. Schwab
Attorney United States Patent Office 3,463,555
Patented Aug. 26, 1969

3,463,555
VEHICLE WHEEL BRAKING SYSTEM PROVIDING WHEEL SLIP CONTROL
Neil J. Ryskamp, Markham, Ill., assignor to Allis-Chalmers Manufacturing Company, Milwaukee, Wis.
Continuation of application Ser. No. 683,172, Nov. 15, 1967. This application Nov. 13, 1968, Ser. No. 775,562
Int. Cl. B60t 8/02, 13/00, 11/10
U.S. Cl. 303—21                      10 Claims

ABSTRACT OF THE DISCLOSURE

A braking system is provided for a pair of drive wheels wherein the motion of the vehicle provides power for braking the wheels under the selective manual control of the operator. The power braking effort is proportional to the speed of rotation of the wheels thereby controlling skidding of the vehicle during power braking. Disproportionate division of torque to the drive wheels under driving conditions is prevented automatically by application of braking effort to the drive wheel tending to spin. This last function is accomplished without operation of the manual brake control by the operator.

---

This case is a continuation of application Ser. No. 683,172, filed Nov. 15, 1967, now abandoned.

This invention relates to a braking system which achieves (1) torque proportioning between a pair of differential connected drive wheels, (2) skid control during braking and (3) power assist braking when the vehicle is in motion.

Heretofore others have provided devices for limiting the slipping or skidding of vehicle wheels during brake applications. Also heretofore others have suggested hydraulic control systems for vehicle brakes which tend to synchrinize the speed of a pair of drive wheels. Additionally, others have suggested that a wheel driven pump output be utilized to provide the hydraulic braking force for the associated wheel. The antiskid devices heretofore provided have not been entirely satisfactory in operation and service in that their hydraulic valves tend to hunt and chatter resulting in a broken line of skid marks with attendant wear and shock on tires and drive components.

I have developed a braking system wherein hydraulically operated wheel brakes may be applied by a manual operated control such as a foot pedal operated master cylinder and, when the vehicle is in motion, the rotation of the wheels supplies pressure fluid which effects power operation of the brakes upon operation of the manual brake control. The operator may vary the force of manual control, such as the pedal operating the master cylinder, and this automatically controls the maximum power braking force. In addition, when one of a pair of braked wheels is rotating substantially faster than the other, the braking effort on the wheels will automatically be modified so that greater braking effort will be applied to the higher speed wheel. This achieves skid control during braking of the vehicle. In addition, I provide torque proportioning control for a pair of drive wheels such as those interconnected by a differential, whereby during driving the brake of one wheel will be applied if it rotates at a substantially higher speed than the other wheel. The torque proportioning braking occurs automatically and is not dependent upon operation of the manual brake control.

It is an object of this invention to provide an antiskid means in a vehicle hydraulic braking system which will not be subject to hunting and chattering of valve parts.

It is an object of this invention to provide a braking system for a pair of drive wheels which limits disproportionate slipping of the wheels so as to insure adequate torque to the drive wheel with good traction, reduces wheel skid during braking and affords power braking during vehicle travel above a minimum speed and conventional braking below such minimum speed.

It is a further object of this invention to provide a braking system for a pair of drive wheels wherein the brakes for the drive wheels may be applied through a manually controlled means and wheel driven power generating means providing power assist braking on operation of the manual brake control are operative to automatically brake a spinning drive wheel.

It is a further object of this invention to provide a braking system of the hereinbefore outlined character wherein the vehicle will not be locked up during braking at vehicle speeds above a predetermined rate.

It is a further object of this invention to provide an improved braking system as hereinbefore outlined which can be incorporated into existing vehicle design at minimum expense.

These and other objects of this invention will be apparent to those familiar with the art when the following description is read in conjunction with the drawings, in which:

FIG. 1 is a section view through a drive axle of a vehicle incorporating the present invention with some parts shown schematically;

FIG. 2 is a section view taken along the line II—II;

FIG. 3 is a section view taken along the line III—III; and

FIG. 4 is a section view through an optional gear type pump.

Referring to FIG. 1, a pair of drive wheels 11, 12, are secured for rotation to jack shafts 13, 14, the inner ends of which are splined to side gears 16, 17, of a conventional differential 18 carried in an axle housing 19 by a pair of antifriction bearings 21, 22. The differential 18 also includes planet pinions 23 rotatably mounted on a cage 20 and meshing with side gears 16, 17, and a bevel ring gear secured to the cage which meshes with a driving pinion 26 secured for rotation with a drive shaft 27. The drive shaft 27 is connected to a source of power (not shown) and is carried by a conventional bearing 28. The wheels 11, 12, have brake operating mechanisms including wheel brakes 31, 32, operatively associated therewith. Wheel brake 31 includes a brake drum 33 secured to the hub of wheel 11 and conventional brake shoes 34 which are moved into contact with the brake drum 33 upon a wheel cylinder 36 being supplied with hydraulic pressure fluid. Wheel brake 32 is similiar in construction, having a drum 37, brake shoes 38 and a hydraulically actuated wheel cylinder 39. The wheel cylinders 31, 32, are provided with hydraulic fluid by manually operated hydraulic pressure generating means in the form of a master cylinder 44 and connecting pedal 46 through conduit 41 and branch conduits 42, 43. As illustrated, one end of conduit 41 is connected to the master cylinder 44 and the ends of branch conduits 42, 43, are connected to the wheel cylinders 36, 39, respectively.

When the vehicle is either moving slowly or not in motion, and the manual control 46 is operated, pressure fluid from the master cylinder 44 is supplied to the wheel cylinders 36, 39, to provide normal braking action. The pressure of fluid in the manually controlled circuit or conduit 41 is employed to regulate the maximum braking force that can be applied by an auxiliary power braking means which will next be described.

Fluid power for the power braking means is provided by a pair of power generating means in the form of pumps 51, 52, which have their pumping component connected in driven relation to the wheels 11, 12 through splined connections with their jack shafts 13, 14. The pumps 51, 52 are commercially available Gerotor pumps equipped with automatic operating eccentric reversing rings to provide flow in one direction regardless of the direction of rotation of the pump. Each of the pumps 51, 52, draws fluid from a reservoir through input conduits 53, 54, and delivers output fluid through output circuits or conduits 56, 57. Pressure fluid delivered by pump 51 to output conduit 56 will operate a servo mechanism 61 provided the escape of fluid to reservoir conduit 62 by way of a bypass passage in the form of conduit 63 is restricted sufficiently by the automatic control valve assembly 64. Similarly, the pressure fluid delivered to output conduit 57 by pump 52 will operate the servo mechanism 66 provided the rate of flow of pressure fluid through a bypass passage in the form of conduit 67 is not so great as to cause the pressure in conduit 57 to be below some predetermined minimum value. The servo mechanisms 61, 66, have pistons 68, 69, respectively, which, as illustrated, are biased by return springs 70, 71, to their inoperative retracted positions wherein the ports 81, 82, are unobstructed. In this condition the manual brake circuit controls the fluid pressure in wheel cylinders 36, 39, by virtue of conduits 42, 43, being open passageways through the ports 81, 82, and chambers 72, 72', in servo mechanisms 61, 66.

When the vehicle is in motion and the brake pedal 46 is depressed, pressure fluid is directed to the wheel cylinders 36, 39, by way of conduits 42, 43, and simultaneously through a branch conduit 74 to a plunger 73 of a pressure regulating valve which also includes a ball 76. The plunger 73 in housing 65 will be moved to the right against ball 76 thereby closing off the main escape route for the fluid delivered by pumps 51, 52. This action causes the pressure of fluid in output conduits 56, 57, to rise and if the vehicle is traveling above a predetermined slow speed the pistons 68, 69, will move against the action of their return springs 70, 71, blocking ports 81, 82. Further movement of the pistons 68, 69, under the fluid pressure output of pumps 51, 52, effects increased pressure of the fluid trapped in chambers 72, 72', conduit portions 42', 43', and wheel cylinders 36, 39. Thus the wheel driven pumps 51, 52, provide auxiliary power braking with the plunger 73 and ball 76 acting as a pressure regulating means for the power braking circuits 56, 57.

Some fluid delivery from pumps 51, 52, is permitted to escape to reservoir by way of bleed passages 77, 78, to prevent lockup of the wheels during power braking. The power braking system is capable of exerting about 5.5 times the braking force as delivered by the manual control means 44, 46. This is accomplished by making the pressure area of plunger 73 about 5.5 times the area of seat 75 for ball 76. Thus the pressure of 10 p.s.i. exerted against the plunger 73 by fluid in conduit 74 and chamber 74' will maintain a pressure of 55 p.s.i. in the power braking circuit. The ratio of plunger size and ball seat can be varied to provide the best "pedal feel" for particular vehicles and braking systems. Any excess pressure built-up by the pumps 51, 52, passes to reservoir by way of pressure regulating valve 76 and, accordingly, the operator, by varying the pressure on the brake pedal 46, can effectively select the desired power braking pressure effected by the servo mechanisms 61, 66. Increase or decrease of the master cylinder pressure will be proportionally reflected in the power braking pressure at the 1 to 5.5 ratio. Since each wheel receives its braking pressure from the pump it drives, the loss of traction causing one wheel to slide during braking will also stop the pump supplying pressure for applying its brake. Loss of pressure will then occur in the power braking circuit and the braking force is correspondingly decreased. An equilibrium will be reached in which the wheel and pump will turn slowly and not lock up. Rotation of the wheels during braking at relatively substantial vehicle travel speeds may be insured by providing pumps with low volumetric efficiency or bleed passages or both. As is well known the braking efficiency is greatly reduced if the wheels lock up (stop rotating) during braking. In the event of use of a wheel driven pump with a high volumetric efficiency, the bleed passages 77, 78 provide a desired rate of leakage thereby insuring that the wheels will not lock up when braking at relatively substantial vehicle speeds. Bleed passages 77, 78, are never blocked by pistons 87, 91, since, when the balls 86, 94, are seated on their seats 85, 95, respectively, the pistons 87, 91 will not be at the end of their stroke.

If during braking, one wheel is turning at a predetermined greater speed than the other wheel, the output of the pump of the higher speed wheel will cause the associated check valve to close in the automatic control means 64, thereby increasing further the pressure applied to the brake of the wheel having higher rotational speed. In accomplishing this, valves 86, 94 and plungers 87, 91 act as fluid pressure responsive means. For instance, if wheel 12 is traveling substantially faster than wheel 11, the pressure of fluid escaping by way of double acting ball check valve 86 will be sufficient to move plunger 87 downwardly against the pressure fluid delivered by pump 51 to the pressure chamber 88 by way of passage 89. At the same time, the higher pressure in bypass conduit 67 will act on plunger 91 through a passage 92 connected with chamber 93, thereby holding it in the position illustrated wherein it prevents double acting ball check valve 94 from moving upwardly against seat 95. It will be noted that the seating of ball 86 on seat 85 prevents the higher pressure fluid of conduit 67 from passing into central passageway 90, where it could act against ball 94. Also the high pressure delivery by one pump due to the high speed of the wheel associated therewith, will insure fluid escape from the low pressure side, thus providing a means for proportioning torque to a pair of drive wheels which is automatic in operation and independent of manually controlled brake means 44, 46.

In some instances, excessive pressure build up may occur in the output conduits 56, 57 and to relieve such pressure, I provide a pair of relief valves 101, 102, in bypassing relation to the flow control means 86, 87, and 91 94, respectively, so as to permit the relieving of pump output conduits 56, 57, via operator controlled valve 76. For instance, during a torque proportioning function, the valve 76 will be open and the relief valves 101, 102, will limit the brake pressure that can be applied to the overspeeding wheel. The pressure at which the spring biased relief valves 101, 102, will open is substantially lower than the pressure required to open pressure regulating means 76, 73, when the operator exerts an intermediate force on brake pedal 46. Thus in order to insure effective power braking I locate the relief valves 101, 102, in upstream relation to the pressure regulating valve 76, 73.

The bleed passages 77, 78, provided to prevent lockup of the wheels during braking by bleeding off a portion of the output of the pumps 51, 52, are also shown in FIGS. 2 and 3. Flow adjusting mean in the form of a pair of adjustable needle valves 103, 104, are employed to adjust the flow rate in bypass passages 77, 78, respectively. The capacities of the pumps 51, 52, are such that the braking force on the wheel with traction will not be adversely affected by the leakage through bypass passages 77, 78. Since each wheel receives its power braking pressure from its rotation, the loss of traction during braking causing the wheel to slide, also stops the pump supplying its brake. The bleed passage associated with the sliding wheel power braking circuit will cause an equilibrium to be reached in which the wheel and its pump will turn slowly, at less than the speed of the vehicle, thus preventing the wheel from locking up during braking. The wheel with traction will build up and maintain a full pressure in its braking system through operation of its pump, as governed by the master cylinder pressure acting on plunger 73. The ball check valves 86, 94, prevent transfer of high pressure fluid from one power brake circuit to the other, that is, between conduit 56 and conduit 57. Fluid from the manually operated fluid pressure generating means 44, 46, and its hydraulic circuit 41, 42, 43, 42', 43', is prevented from being intermixed with fluid from the power braking circuits 56, 57 by the pistons 68, 69, in servo mechanisms 61, 66, and the plunger 73. In other words, there is no fluid communication between the manual and power braking circuits.

In FIG. 4, I show an alternate type of pump, namely a gear type pump, having one of its gears 111 connected for rotation with a jack shaft 13'. The input 53' supplies one of the input-output chambers 112, 113, depending on the direction of the rotation of the pump. For instance, if gear 111 is rotated clockwise as viewed in FIG. 4, fluid from input 53' will be drawn past check valve 114 into chamber 113 and fluid will be discharged through check valve 116 to output conduit 56'. If gear 111 is rotated in the opposite direction, the fluid is drawn through conduit 53' via check valve 117 and delivered by the gear pump to output conduit 56' via check valve 118.

From the foregoing description it is believed apparent that I have provided an extremely novel and useful braking arrangement which achieves four important functions, namely:

(1) Braking of the vehicle when stationary through the manually controlled brake operating means 44, 46;

(2) Power assist braking during vehicle travel with braking force regulated by the pressure of the manual brake control means 44, 46;

(3) Reduced skidding during power braking by automatic decrease of braking effort on the skidding wheel; and (4) Automatic torque proportioning for a pair of drive wheels by automatic braking of the drive wheel with the greater speed.

These functions are achieved by a mechanism which operates smoothly, without valve chatter, may be incorporated in existing vehicle designs with minimum modification and is easily adjusted and maintained.

The embodiments of the invention in which an exclusive property or privilege is claimed are defined as follows:

1. In a braking system for a pair of power driven wheels,
   a hydraulically operated brake for each of said wheels,
   manually operated hydraulic pressure generating means connected to said brakes through means including a hydraulic circuit,
   a fluid pump connected in driven relation to each of said wheels,
   a pair of fluid power braking circuits interconnecting said pumps and brakes having the same wheel association,
   pressure regulating means connected to said power braking circuits for regulating the maximum pressure therein in proportion to the pressure generated by said manually operated fluid pressure generating means, and
   fluid pressure responsive means associated with said power braking circuits for automatically effecting braking of one of said wheels independently of said pressure generating means upon its overspeeding the other of said wheels sufficiently to create a predetermined pressure differential between said power braking circuits.

2. The invention of claim 1 including a differential mechanism interconnecting said wheels.

3. The invention of claim 1 including means preventing fluid communication between said hydraulic circuit and said pair of power braking circuits and wherein said pumps deliver pressure fluid to said power braking circuits, respectively, in either direction of rotation of said wheels.

4. The invention of claim 1 wherein said hydraulic circuit includes a pair of branch conduits connected to said hydraulic operated brakes, respectively, and further comprising a pair of servo mechanisms interconnecting said power braking circuits and said branch conduits.

5. The invention of claim 1 wherein said pressure regulating means includes reciprocable valve means with opposite ends subject to the fluid pressure of said hydraulic and power braking circuits, respectively.

6. The invention of claim 1 and further comprising bleed means bypassing a part of the output of each of said pumps to insure rotation of said wheels during braking thereof at substantial vehicle speeds.

7. The invention of claim 1 wherein said fluid flow responsive means includes bypass passages connected to said power braking circuits, respectively, and to said pressure regulating means and flow control means permitting flow of fluid from said power braking circuits to said pressure regulating means by way of said bypass passages when both of said power braking circuits are pressurized and preventing flow of fluid from one of said circuits by way of its associated bypass passage when the fluid pressure therein exceeds the pressure in the other of said circuits by a predetermined value.

8. The invention of claim 7 and further comprising a pair of relief valves connected in bypassing relation to said flow control means, respectively.

9. The invention of claim 8 wherein said relief valves are in upstream relation to said pressure regulating means.

10. The invention of claim 7 and further comprising bleed means bypassing a part of the output of each of said pumps to insure rotation of said wheels during braking thereof at substantial vehicle speeds.

References Cited

UNITED STATES PATENTS

| | | | |
|---|---|---|---|
| 3,124,220 | 3/1964 | Kell | 188—181 |
| 3,264,039 | 8/1966 | Cadiou | 303—21 XR |
| 3,264,040 | 8/1966 | Brueder | 303—21 |
| 3,288,232 | 11/1966 | Shepherd | 303—21 XR |

MILTON BUCHLER, Primary Examiner

J. J. McLAUGHLIN, Jr., Assistant Examiner

U.S. Cl. X.R.

188—152, 181; 303—6, 10, 13